(12) United States Patent
Omran et al.

(10) Patent No.: US 12,582,972 B1
(45) Date of Patent: *Mar. 24, 2026

(54) ZIRCONIUM DIOXIDE/CALCIUM SILICATE/GRAPHITIC CARBON NITRIDE NANOCOMPOSITE AND METHOD OF USE AS A PHOTOCATALYST

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/249,857

(22) Filed: Jun. 25, 2025

(51) Int. Cl.
*B01J 27/24* (2006.01)
*B01J 21/06* (2006.01)
(Continued)

(52) U.S. Cl.
CPC ............. *B01J 27/24* (2013.01); *B01J 21/066* (2013.01); *B01J 23/02* (2013.01); *B01J 35/39* (2024.01); *B01J 35/45* (2024.01); *B01J 35/51* (2024.01); *B01J 35/613* (2024.01); *B01J 35/633* (2024.01); *B01J 35/647* (2024.01); *B01J 35/695* (2024.01);
(Continued)

(58) Field of Classification Search
CPC ........................... B01J 35/695; C02F 2305/10
See application file for complete search history.

(56) References Cited

U.S. PATENT DOCUMENTS

2018/0002240 A1* 1/2018 Riman ................... B01D 53/62

FOREIGN PATENT DOCUMENTS

| | | |
|---|---|---|
| CN | 111715284 A | 9/2020 |
| CN | 117225445 A | 12/2023 |
| KR | 10-2023-0135238 A | 9/2023 |

OTHER PUBLICATIONS

Chand, et, al., g-C3N4/ZrO2 composite material, Ceramics International, 2023 (Year: 2023).*

(Continued)

*Primary Examiner* — Bradley R Spies
*Assistant Examiner* — Jeannie Mcdermott
(74) *Attorney, Agent, or Firm* — Oblon, McClelland, Maier & Neustadt, L.L.P.

(57) ABSTRACT

A method of water purification includes mixing contaminated water with a zirconium dioxide ($ZrO_2$)/calcium silicate ($CaSiO_3$)/graphitic carbon nitride (g-$C_3N_4$) based nanocomposite material to form a reaction mixture, further exposing the resultant reaction mixture to light, and removing the nanocomposite material to form purified water. The nanocomposite material consists of spherical metal oxide nanoparticles including a $ZrO_2$ phase and a $CaSiO_3$ phase dispersed on a matrix of g-$C_3N_4$ nanosheets, where the spherical metal oxide nanoparticles have an average particle diameter in a range from 2-25 nanometer (nm), and the nanocomposite material has a band gap energy in a range from 1.5-4 electron volt (eV).

19 Claims, 7 Drawing Sheets

(51) Int. Cl.

| | |
|---|---|
| B01J 23/02 | (2006.01) |
| B01J 35/39 | (2024.01) |
| B01J 35/45 | (2024.01) |
| B01J 35/51 | (2024.01) |
| B01J 35/61 | (2024.01) |
| B01J 35/63 | (2024.01) |
| B01J 35/64 | (2024.01) |
| B01J 35/66 | (2024.01) |
| B01J 37/00 | (2006.01) |
| B01J 37/04 | (2006.01) |
| B01J 37/06 | (2006.01) |
| B01J 37/34 | (2006.01) |
| C02F 1/32 | (2023.01) |
| C02F 1/72 | (2023.01) |
| C02F 101/30 | (2006.01) |
| C02F 101/22 | (2006.01) |

(52) U.S. Cl.
CPC ............. *B01J 37/009* (2013.01); *B01J 37/04* (2013.01); *B01J 37/06* (2013.01); *B01J 37/343* (2013.01); *C02F 1/32* (2013.01); *C02F 1/725* (2013.01); *C02F 2101/22* (2013.01); *C02F 2101/306* (2013.01); *C02F 2101/308* (2013.01); *C02F 2305/10* (2013.01)

(56) References Cited

OTHER PUBLICATIONS

Yao, et, al. Synthesis and enhanced visible-light photocatalytic activity of wollastonite/g-C3N4 composite Materials Research, 2017 (Year: 2017).*

Ahmed T. Mosleh, et al., "Photodegradation of Wastewater Containing Organic Dyes Using Modified G-C3N4-Doped ZrO2 Nanostructures: Towards Safe Water for Human Beings", Catalysts 2024, vol. 14, Issue 1, 42, Jan. 7, 2024, 20 pages.

H. M. Shinde, et al., "An innovative fabrication of g-C3N4-ZrO2 nanocomposite with enhanced photocatalytic degradation of methylene blue under UV-visible light", Journal of Optics, Dec. 4, 2024, Abstract Only, 14 pages.

* cited by examiner 0.24 nm

ZIRCONIUM DIOXIDE/CALCIUM SILICATE/GRAPHITIC CARBON NITRIDE NANOCOMPOSITE AND METHOD OF USE AS A PHOTOCATALYST

BACKGROUND

Technical Field

The present disclosure is directed to a nanocomposite material, and more particularly, a zirconium dioxide ($ZrO_2$)/calcium silicate ($CaSiO_3$)/graphitic carbon nitride (g-$C_3N_4$) nanocomposite material used as a photocatalyst for wastewater treatment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Environmental pollution, particularly from waterborne contaminants, remains a major global concern. Industrial activities such as chemical manufacturing, textile production, mining, and electroplating often release harmful pollutants, including heavy metals like cadmium (Cd), chromium (Cr), copper (Cu), lead (Pb) and zinc (Zn) into water systems. These contaminants are highly toxic, carcinogenic, non-biodegradable, and can accumulate in food chains, posing serious health risks such as cancer, neurological damage, and organ failure. As a result, the removal of these pollutants from water will protect both the environment and human health.

Traditional water treatment methods, such as membrane filtration, ion exchange, and coagulation, have been used to address this issue, but these methods include certain limitations, including high costs and energy consumption. As an alternative, visible light-driven photocatalysis has emerged as a promising solution for water purification. Photocatalysts activated by visible light can efficiently photodegrade organic and inorganic pollutants in water, offering a sustainable and energy-efficient remediation approach.

One of the most promising materials for visible light photocatalysis is graphitic carbon nitride (g-$C_3N_4$). g-$C_3N_4$ is an inexpensive, stable, and environmentally friendly photocatalyst that can absorb visible light, making it suitable for applications in water treatment under natural sunlight. However, its inherent limitations, such as a relatively low surface area and rapid recombination of photogenerated electron-hole pairs, hinder its overall photocatalytic efficiency. Recent efforts have focused on overcoming these challenges by modifying g-$C_3N_4$ through strategies such as doping with heteroatoms, integrating metal nanoparticles, and designing composite structures. These modifications aim to enhance the surface area, improve charge separation, and extend the absorption spectrum of g-$C_3N_4$, making it more effective for degrading water pollutants under visible light. The addition of metal oxide nanoparticles, can improve the photocatalytic activity by facilitating electron transfer and enhancing the material's response to visible light. The visible light-active photocatalysis approach has shown great promise for degrading various pollutants, including organic dyes, heavy metals, and other toxic compounds, offering an environmentally friendly and cost-effective method for water purification.

Although a few nanocomposite materials have been used as a photocatalyst for wastewater treatment in the past, each of them suffers from one or more drawbacks hindering their adoption. Accordingly, one object of the present disclosure is to provide an efficient method for water purification that effectively removes pollutants from contaminated water.

SUMMARY

In an exemplary embodiment, a method of water purification and properties of a nanocomposite is described. The method includes mixing contaminated water with a zirconium dioxide ($ZrO_2$)/calcium silicate ($CaSiO_3$)/graphitic carbon nitride (g-$C_3N_4$) nanocomposite material to form a reaction mixture and exposing the resultant reaction mixture to light and further removing the nanocomposite material to form purified water. The nanocomposite material consists of spherical metal oxide nanoparticles including a $ZrO_2$ phase and a $CaSiO_3$ phase dispersed on a matrix of g-$C_3N_4$ nanosheets. The spherical metal oxide nanoparticles have an average particle diameter in a range from 2 to 25 nanometer (nm), and the band gap energy of the nanocomposite in a range from 1.5 to 4 electron volt (eV).

In some embodiments, the nanocomposite material has a band gap energy in a range from 2.3 to 3.7 eV.

In some embodiments, the nanocomposite material has a band gap energy in a range from 2.6 to 3.4 eV.

In some embodiments, the nanocomposite material has a band gap energy in a range from 2.9 to 3.1 eV.

In some embodiments, the nanocomposite material has a band gap energy of 3.0 eV.

In some embodiments, the nanocomposite material has a Brunauer-Emmett-Teller (BET) surface area greater than or equal to 50 square meters per gram ($m^2 \cdot g^{-1}$).

In some embodiments, the nanocomposite material has a BET surface area greater than or equal to 55 $m^2 \cdot g^{-1}$.

In some embodiments, the nanocomposite material has a BET surface area greater than or equal to 60 $m^2 \cdot g^{-1}$.

In some embodiments, the nanocomposite material has a BET surface area greater than or equal to 65 $m^2 \cdot g^{-1}$.

In some embodiments, the nanocomposite material has a BET surface area greater of 66.5 $m^2 \cdot g^{-1}$.

In some embodiments, the nanocomposite material has a pore volume greater than or equal to 0.10 cubic centimeters per gram ($cm^3 \cdot g^{-1}$).

In some embodiments, the nanocomposite material has a pore volume greater than or equal to 0.15 $cm^3 \cdot g^{-1}$.

In some embodiments, the nanocomposite material has a pore volume greater than or equal to 0.20 $cm^3 \cdot g^{-1}$.

In some embodiments, the nanocomposite material has a pore volume greater than or equal to 0.25 $cm^3 \cdot g^{-1}$.

In some embodiments, the nanocomposite material has a pore volume of 0.26 $cm^3 \cdot g^{-1}$.

In some embodiments, the nanocomposite material has a trimodal pore size distribution with average pore diameters maximized at 6.2 nm, 9.53 nm and 17.2 nm.

In some embodiments, the spherical metal oxide nanoparticles have an average particle diameter in a range from 3 to 18 nm.

In some embodiments, the spherical metal oxide nanoparticles have an average particle diameter in a range from 5 to 12 nm.

In some embodiments, the spherical metal oxide nanoparticles have an average particle diameter in a range from 7 to 10 nm.

In some embodiments, the spherical metal oxide nanoparticles have an average particle diameter of 8.5 nm.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
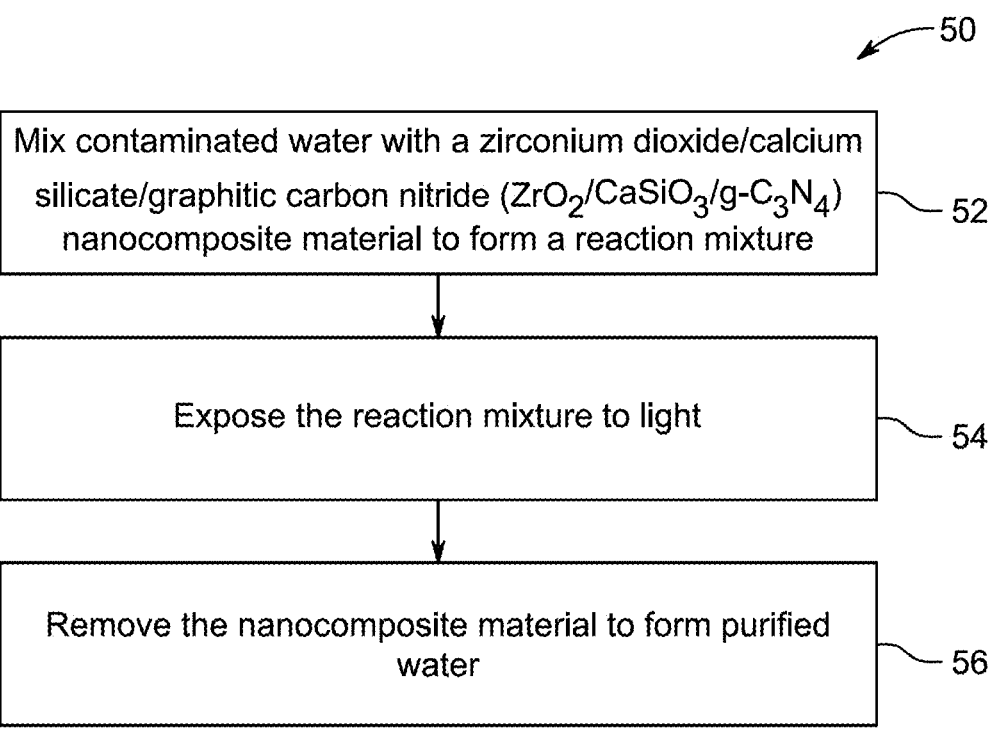
FIG. 1 is a flowchart depicting a method for water purification, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (C)±3° C. in the present disclosure.

As used herein, the term 'nanocomposite' refers to a composite material in which at least one dimension of the component is in the nanometer size scale (<1000 nanometer (nm)). The nanocomposites are thus poly-phase solid materials made up of one or more nanomaterials. The term includes all types of multiphase solid materials in which one of the phases has one, two, or three dimensions of less than 1000 nm.

As used herein, the term 'nanoparticles (NPs)' refers to particles having a particle size of 1 nm to 1000 nm within the scope of the present disclosure. The NPs may exist in various morphological shapes, such as nanosheets, nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof.

As used herein, the term g-$C_3N_4$ nanosheets refers to thin, two-dimensional sheets of graphitic carbon nitride (g-$C_3N_4$), a material composed of carbon, nitrogen, and hydrogen atoms arranged in a graphitic-like structure. These nanosheets are typically several nanometers thick and possess unique electronic properties, making them suitable for various applications, including photocatalysis, energy storage, and sensing. The nanosheets can enhance a material's photocatalytic efficiency by providing more active sites for reactions and improving the separation of charge carriers under visible light irradiation.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C. and 1° C.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}$C and $^{14}$C. Isotopes of oxygen include $^{16}$O, $^{17}$O, and $^{18}$O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'contaminated water' refers to water that contains harmful substances, including but not limited to organic pollutants, heavy metals, toxic chemicals, industrial effluents, and other hazardous materials, which negatively affect water quality and pose a risk to human health and the environment. Contaminants in such water can include substances like heavy metals (e.g., cadmium, chromium, copper, lead, and zinc), industrial dyes, pesticides, pharmaceuticals, and other pollutants.

As used herein, the term 'photocatalysis' refers to a process in which a photocatalyst absorbs UV (ultraviolet) or visible light and, upon activation, accelerates a chemical reaction without being consumed in the process. This reaction typically involves the degradation or transformation of pollutants, organic compounds, or harmful substances in the presence of light. Photocatalysis is widely used in environmental applications, such as water purification, air cleaning, and solar energy conversion, as the photocatalyst facilitates the breakdown of contaminants into harmless byproducts, often producing environmentally friendly results.

As used herein, the term 'BET' refers to the Brunauer-Emmett-Teller method, a widely used technique for determining the surface area and porosity of materials. It is based on the adsorption of nitrogen gas onto the surface of the material and is commonly employed to calculate specific surface area, pore volume, and pore size distribution.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a useful parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a useful parameter in characterizing the porous structure of materials, such as adsorbents or catalysts.

As used herein, the term 'trimodal pore size distribution' refers to a material having three distinct pore size ranges or peaks within its pore size distribution.

As used herein, the term 'average particle diameter' refers to the mean size of particles within a given sample, typically measured in nm or micrometers ($\mu m$). It is calculated by averaging the diameters of many individual particles, often determined using techniques such as dynamic light scattering (DLS), transmission electron microscopy (TEM), or scanning electron microscopy (SEM).

As used herein, the term 'band gap energy' refers to the energy difference between the valence band and the conduction band of a material. It represents the minimum energy required to excite an electron from the valence band to the conduction band, enabling electrical conduction. In the context of photocatalysts, the band gap energy determines the material's ability to absorb light and initiate photocatalytic reactions. A smaller band gap allows the material to absorb visible light more efficiently. The band gap is typically measured in electron volts (eV).

An aspect of the present disclosure is directed to a method of water purification using a zirconium oxide ($ZrO_2$)/calcium silicate ($CaSiO_3$)/graphitic carbon nitride (g-$C_3N_4$) nanocomposite (nanocomposite material).

According to a first aspect of the present disclosure, a nanocomposite material is described. The nanocomposite material includes zirconium oxide/calcium silicate/graphitic carbon nitride ($ZrO_2$/$CaSiO_3$/g-$C_3N_4$). The nanocomposite material includes spherical metal oxide nanoparticles consisting of a $ZrO_2$ phase and a $CaSiO_3$ phase dispersed on a matrix of g-$C_3N_4$ nanosheets.

In some embodiments, the spherical metal oxide nanoparticles have an average particle diameter in a range from 0.5-50 nm, preferably 2-25 nm, preferably 2.1-24.9 nm, preferably 2.2-24.8 nm, preferably 2.3-24.7 nm, preferably 2.4-24.6 nm, preferably 2.5-24.5 nm, preferably 3-24 nm, preferably 3.5-23.5 nm, preferably 4-23 nm, preferably 4.5-22.5 nm, preferably 5-22 nm, preferably 5.5-21.5 nm, preferably 6-22 nm, preferably 6.5-21.5 nm, preferably 7-21 nm, preferably 7.5-20.5 nm and preferably 8-20 nm, in a range from 3-18 nm, preferably 3.1-17.9 nm, preferably 3.2-17.8 nm, preferably 3.3-17.7 nm, preferably 3.4-17.6 nm, preferably 3.5-17.5 nm, preferably 4-17 nm, preferably 4.5-16.5 nm, preferably 5-16 nm, preferably 5.5-15.5 nm, preferably 6-15 nm, preferably 6.5-14.5 nm, preferably 7-14 nm, preferably 7.5-13.5 nm and preferably 8-13 nm, in a range from 5-12 nm, preferably 5.1-11.9 nm, preferably 5.2-11.8 nm, preferably 5.3-11.7 nm, preferably 5.4-11.6 nm, preferably 5.5-11.5 nm, preferably 6-11 nm, preferably 6.5-10.5 nm, preferably 7-10 nm, preferably 7.5-9.5 nm and preferably 8-9 nm, in a range from 7-10 nm, preferably 7.1-9.9 nm, preferably 7.2-9.7 nm, preferably 7.3-9.6 nm, preferably 7.4-9.5 nm, preferably 7.5-9.4 nm, preferably 7.6-9.3 nm, preferably 7.7-9.2 nm, preferably 7.8-9.1 nm, preferably 7.9-9.0 nm, preferably 8.0-8.9 nm, preferably 8.1-8.8 nm, preferably 8.2-8.7 nm and preferably 8.3-8.6 nm. In a preferred embodiment, the spherical metal oxide nanoparticles present on the nanocomposite material have an average particle diameter of 8.5 nm.

In one or more embodiments, the mass ratio of the $ZrO_2$:$CaSiO_3$:g-$C_3N_4$ phases is in a range from 1-5:1-5:1-10, preferably 1-3:1-3:1-5, preferably 1-2:1-2:1-3, preferably around 1:1:2.

In some embodiments, the nanocomposite material is in the form of particles having a BET surface area greater than or equal to 30 square meters per gram ($m^2 \cdot g^{-1}$), preferably 50 $m^2 \cdot g^{-1}$, preferably greater than or equal to 50.5 $m^2 \cdot g^{-1}$, preferably greater than or equal to 51 $m^2 \cdot g^{-1}$, preferably greater than or equal to 51.5 $m^2 \cdot g^{-1}$, preferably greater than or equal to 52 $m^2 \cdot g^{-1}$, preferably greater than or equal to 52.5 $m^2 \cdot g^{-1}$, preferably greater than or equal to 53 $m^2 \cdot g^{-1}$, preferably greater than or equal to 53.5 $m^2 \cdot g^{-1}$, preferably greater than or equal to 54 $m^2 \cdot g^{-1}$ and preferably greater than or equal to 54.5 $m^2 \cdot g^{-1}$, greater than or equal to 55 $m^2 \cdot g^{-1}$, preferably greater than or equal to 55.5 $m^2 \cdot g^{-1}$, preferably greater than or equal to 56 $m^2 \cdot g^{-1}$, preferably greater than or equal to 56.5 $m^2 \cdot g^{-1}$, preferably greater than or equal to 57 $m^2 \cdot g^{-1}$, preferably greater than or equal to 57.5 $m^2 \cdot g^{-1}$, preferably greater than or equal to 58 $m^2 \cdot g^{-1}$, preferably greater than or equal to 58.5 $m^2 \cdot g^{-1}$, preferably greater than or equal to 59 $m^2 \cdot g^{-1}$ and preferably greater than or equal to 59.5 $m^2 \cdot g^{-1}$, greater than or equal to 60 $m^2 \cdot g^{-1}$, preferably greater than or equal to 60.5 $m^2 \cdot g^{-1}$, preferably greater than or equal to 61 $m^2 \cdot g^{-1}$, preferably greater than or equal to 61.5 $m^2 \cdot g^{-1}$, preferably greater than or equal to 62 $m^2 \cdot g^{-1}$, preferably greater than or equal to 62.5 $m^2 \cdot g^{-1}$, preferably greater than or equal to 63 $m^2 \cdot g^{-1}$, preferably greater than or equal to 63.5 $m^2 \cdot g^{-1}$, preferably greater than or equal to 64 $m^2 \cdot g^{-1}$, preferably greater than or equal to 64.5 $m^2 \cdot g^{-1}$ and greater than or equal to 65 $m^2 \cdot g^{-1}$. In a preferred embodiment, the nanocomposite has surface area of 66.5 $m^2 \cdot g^{-1}$.

In some embodiments, the nanocomposite material is in the form of particles having a monomodal, bimodal, trimodal, polydisperse and uniform pore size distribution. In a preferred embodiment, the nanocomposite material is in the form of particles having a trimodal pore size distribution with average pore diameters maximized at 6.2 nm, 9.53 nm and 17.2 nm.

In some embodiments, the nanocomposite material is in the form of particles having a pore volume greater than or equal to 0.05 $cm^3 \cdot g^{-1}$, preferably 0.10 $cm^3 \cdot g^{-1}$, preferably greater than or equal to 0.11 $cm^3 \cdot g^{-1}$, preferably greater than or equal to 0.12 $cm^3 \cdot g^{-1}$, preferably greater than or equal to 0.13 $cm^3 \cdot g^{-1}$ and preferably greater than or equal to 0.14 $cm^3 \cdot g^{-1}$, greater than or equal to 0.15 $cm^3 \cdot g^{-1}$, preferably greater than or equal to 0.16 $cm^3 \cdot g^{-1}$, preferably greater than or equal to 0.17 $cm^3 \cdot g^{-1}$, preferably greater than or equal to 0.18 $cm^3 \cdot g^{-1}$ and preferably greater than or equal to 0.19 $cm^3 \cdot g^{-1}$, greater than or equal to 0.20 $cm^3 \cdot g^{-1}$, preferably greater than or equal to 0.21 $cm^3 \cdot g^{-1}$, preferably greater than or equal to 0.22 $cm^3 \cdot g^{-1}$, preferably greater than or equal to 0.23 $cm^3 \cdot g^{-1}$ and preferably greater than or equal to 0.24 $cm^3 \cdot g^{-1}$, greater than or equal to 0.25 $cm^3 \cdot g^{-1}$, preferably greater than or equal to 0.26 $cm^3 \cdot g^{-1}$. In a preferred embodiment, the nanocomposite material has a pore volume of 0.26 $cm^3 \cdot g^{-1}$.

In some embodiments, the nanocomposite material has a band gap energy in a range from 1.0-5 eV, preferably 1.5-4 eV, preferably from 1.6-3.9 eV, preferably 1.7-3.8 eV, preferably 1.8-3.7 eV, preferably 1.9-3.6 eV, preferably 2.0-3.5 eV, preferably 2.1-3.4 eV, preferably 2.2-3.3 eV, preferably 2.3-3.2 eV and preferably 2.4-3.1 eV, in a range from 2.3-3.7 eV, preferably 2.4-3.6 eV, preferably 2.5-3.5 eV, preferably 2.6-3.4 eV, preferably 2.7-3.3 eV, preferably 2.8-3.2 eV and preferably 2.9-3.1 eV, in a range from 2.6-3.4 eV, preferably 2.7-3.3 eV and preferably 2.8-3.2 eV, in a range from 2.9-3.1 eV, preferably 3.0-3.1 eV. In a preferred embodiment, the nanocomposite material has a band gap energy of 3.0 eV.

Referring to FIG. 1, a method 50 for water purification using the nanocomposite material is described. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing contaminated water with a zirconium dioxide/calcium silicate/graphitic carbon nitride ($ZrO_2$/$CaSiO_3$/g-$C_3N_4$) nanocomposite material to form a reaction mixture. The mixing may be accomplished through any typical mechanism, including stirring with an impeller, shaking, or vortex mixing. The contaminated water includes one or more pollutants. The pollutant is preferably an organic pollutant. Suitable examples of organic pollutants include, but are not limited to, pesticides, pharmaceuticals, dyes, and other synthetic or natural organic substances that can pose environmental or health risks. In alternate embodiments, the organic pollutants may be a dye, a phenol, a polycyclic aromatic hydrocarbon, an herbicide, a pesticide, a persistent organic pollutant, combinations thereof, or the like. The contaminated water may be sourced from natural bodies of water, such as rivers, lakes, or oceans, or the contaminated water may be obtained from industrial processes, wastewater treatment facilities, or laboratory settings.

In some embodiments, the pollutant is a dye. A dye is a colored substance that chemically binds to a material it is intended to color. Generally, a dye is applied in solution, typically aqueous solution. Examples of dyes include, but are not limited to: basic fuchsin; acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound including of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include, but are not limited to, naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e] pyrene, dibenzo[a,h]pyrene, dibenzo[a,i]pyrene, dibenzo[a, l]pyrene, fluoranthene, fluorine, indeno[1,2,3-c,d]pyrene, 5-methylchrysene, naphthacene, pentaphene, picene, and biphenylene.

An herbicide (also known as 'weedkiller') is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include, but are not limited to, benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include, but are not limited to, antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include, but are not limited to, acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides include, but are not limited to: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides include, but are not limited to, permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides include, but are not limited to, metaldehyde and methiocarb.

A pesticide intended for use against rodents is known as a rodenticide. Examples of rodenticides include, but are not limited to, warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides include, but are not limited to, cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants include, but are not limited to, aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

In some embodiments, the contaminated water, including one or more pollutants, and the nanocomposite material can be mixed for a period that is useful for effective pollutant removal. The mixing time may be varied depending on the specific conditions of the treatment process. In some embodiments, the contaminated water including one or more pollutants and the $ZrO_2/CaSiO_3/g-C_3N_4$ are mixed for 550 minutes (min) or less, preferably 150 min or less, preferably 145 min or less, preferably 140 min or less, preferably 135 min or less, preferably 130 min or less, preferably 125 min or less, for 120 minutes or less, preferably 115 min or less, preferably 110 min or less, preferably 105 min or less, preferably 100 min or less, preferably 95 min or less and for 90 min or less, preferably 85 min or less, preferably 80 min or less, preferably 75 min or less, preferably 70 min or less, preferably 65 min or less, preferably 60 min or less, preferably 55 min or less, preferably 50 min or less, preferably 45 min or less, preferably 40 min or less, preferably 35 min or less and preferably 30 min or less.

At step 54, the method 50 includes exposing the reaction mixture to light. Light sources that can be used for water purification include natural sunlight, UV light, and visible light, depending on the photocatalyst's activation range. In some embodiments, the light source has a wavelength in the range of 100-1000 nm, preferably 200-800 nm, preferably 200-400 nm.

At step 56, the method 50 includes removing the nanocomposite material to form purified water. The nanocomposite material may be removed via techniques like filtration, centrifugation, sedimentation, coagulation, flocculation, and any other typical method to remove solid matter from water. In some embodiments, the nanocomposite material may be subjected to thermal/chemical/biodegradation for easier removal of the nanocomposite material to form the purified water.

EXAMPLES

The following examples demonstrate a $ZrO_2/CaSiO_3/g-C_3N_4$ nanocomposite material including calcium silicate ($CaSiO_3$), graphitic carbon nitride ($g-C_3N_4$) and zirconium dioxide ($ZrO_2$) and a method of production thereof. The examples are provided solely for illustration and are not to be construed as limitations of the present disclosure, as many variations thereof are possible without departing from the spirit and scope of the present disclosure.

Example 1: Fabricating the $CaSiO_3$

To synthesize $CaSiO_3$, 23.6 g of calcium nitrate tetrahydrate and 21.1 g of sodium metasilicate were dispersed in 100 milliliters (mL) of ethanol:water (1:1) in a 150 mL glass beaker and sonicated for 15 minutes (min). The mixture was transferred to a 200 mL autoclave and then placed in an oven operated at 180 degrees Celsius (° C.) for 2.0 hour (h). The product was dispersed in 500 mL distilled water with an ultrasonic bath for 10 min, filtered via a Buchner system, rinsed with distilled water, and dried at 120° C. for 1.0 hour (h).

Example 2: Fabricating the $g-C_3N_4$

For the synthesis of $g-C_3N_4$, 30.0 gram (g) of urea was placed in a 250 mL porcelain crucible and covered with its porcelain lid. The crucible and lid were then wrapped in three layers of aluminum foil to minimize urea loss due to sublimation. The assembly was subsequently heated in a furnace set to 600° C. for 45 minutes (min).

Example 3: Fabricating the $ZrO_2$

For synthesizing $ZrO_2$, 10.0 g of zirconium oxychloride octahydrate and 10.0 g of xylose were placed in a 500 ml beaker. 100 mL of distilled water was added to the mixture and heated until a clear solution was obtained. Subsequently, 10 mL of concentrated nitric acid was added to the mixture, which was then heated until the carbonization of xylose occurred. The mixture was placed in an oven set to 200° C. for 3.0 h, and the black product obtained was then milled in a mortar, transferred to a 150 mL porcelain dish, and calcined at 550° C. for 4.0 h.

Example 4: Fabricating the $ZrO_2/CaSiO_3@g-C_3N_4$

Equal amounts of $CaSiO_3$, $g-C_3N_4$, and $ZrO_2$ (1 gram each) were transferred to a mono wave-200 vial (G30) and were dispersed in 20 mL of ethylene glycol monomethyl ether using an ultrasonic bath for 30 min. The vial was then sealed with its Teflon cover and placed in the Anton Paar Monowave-200, operated at 180° C. and 5.0 bar pressure for one hour. The product was further dispersed in 1 liter (L) of distilled water using an ultrasonic bath for 30 min, filtered through a Buchner system, rinsed with distilled water, and dried at 150° C. for 2.0 h.

Figure 2:
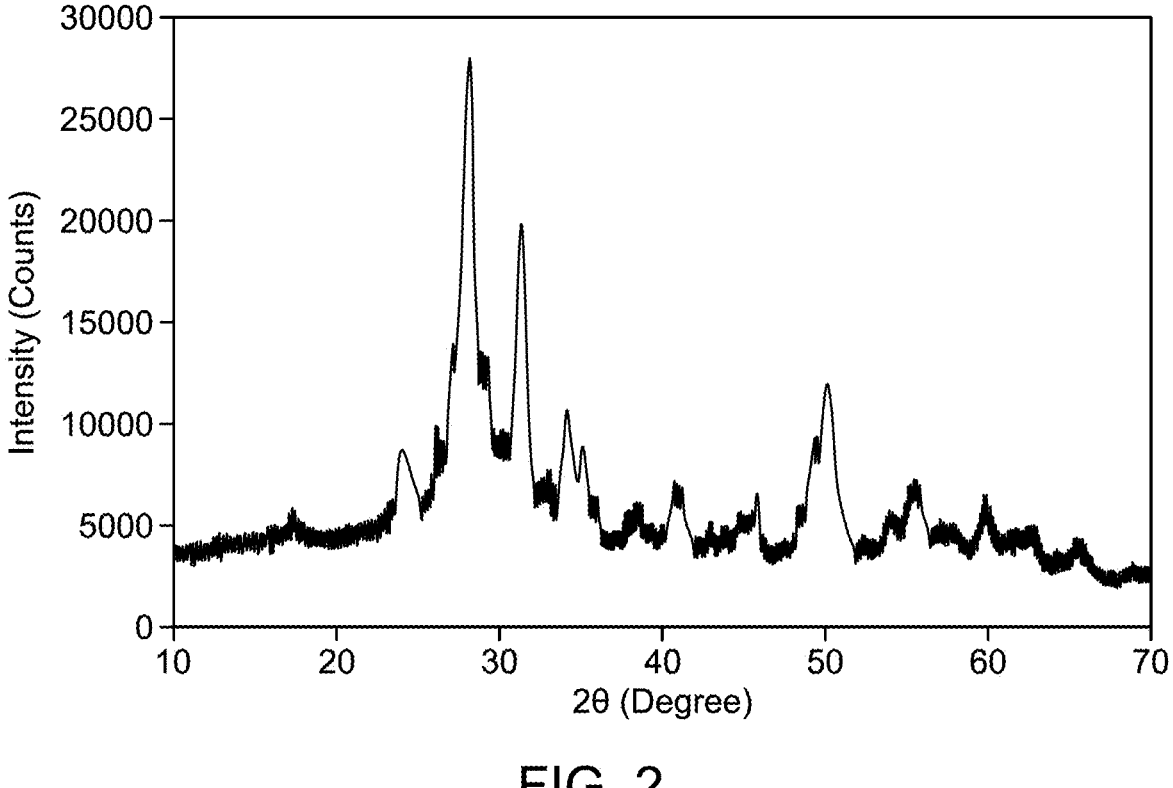
FIG. 2 depicts X-ray diffraction (XRD) diffractogram of zirconium dioxide/calcium silicate/graphitic carbon nitride ($ZrO_2$/$CaSiO_3$/g-$C_3N_4$) nanocomposite, according to certain embodiments.

X-ray diffraction (XRD) used to examine the crystallinity and phase identification of the $ZrO_2/CaSiO_3/g-C_3N_4$ nanocomposite is shown in FIG. 2. The sharp peaks and high-intensity values in the spectra showed that powder is highly crystalline in nature. An analysis of the diffraction patterns using standard PDF cards showed that $ZrO_2$ is the primary phase, while $CaSiO_3$ and $g-C_3N_4$ were present are minor phases. The 2 theta (θ) values observed at 23.9°, 28.0°, 31.3°, 33.9°, and 49.9° corresponding to (011), (−11), (111), (002), and (220) planes were used to index the $ZrO_2$ monoclinic phase (Reference code No. 01-074-0815). Further, the 2θ values at 20.4°, 26.8°, 28.9°, 30.2°, and 50.1° indexed for (21-1), (20-2), (202), (320), and (040), planes correspond to $CaSiO_3$ phase (Reference code 01-072-2297). The $g-C_3N_4$ diffractions peaks were also recorded at 28.5° and 47.5° (Reference code No. 01-072-0497), indicating the $ZrO_2/CaSiO_3/g-C_3N_4$ composite was successfully fabricated, with no additional phases present in the nanocomposite.

Figure 3A:
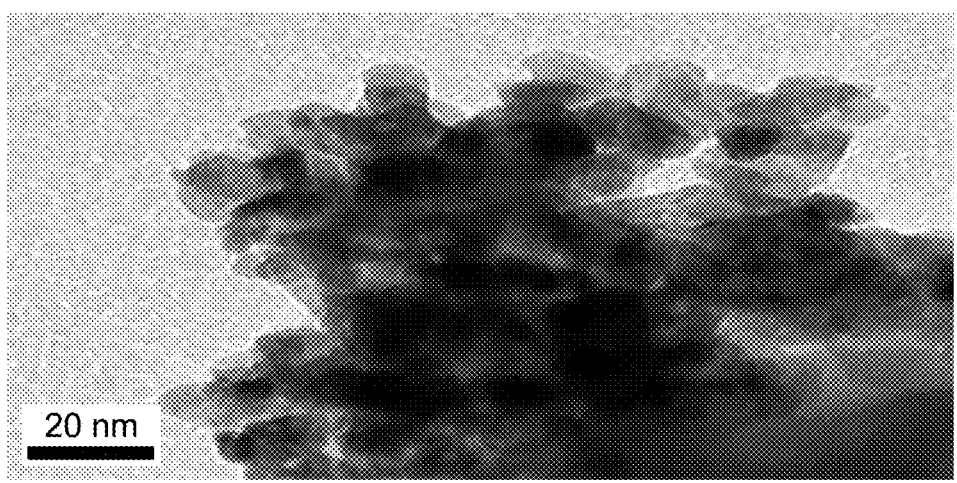
FIGS. 3A, 3B and 3C show transmission electron microscopy (TEM) images of the $ZrO_2$/$CaSiO_3$@g-$C_3N_4$ nanocomposite, at different magnifications, according to certain embodiments.
Figure 3B:
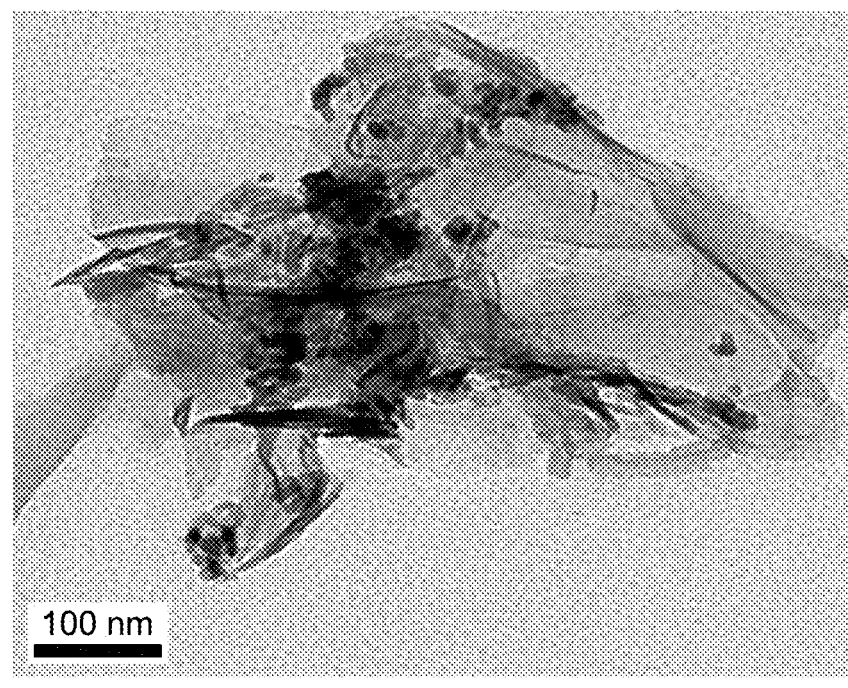
Figure 3C:
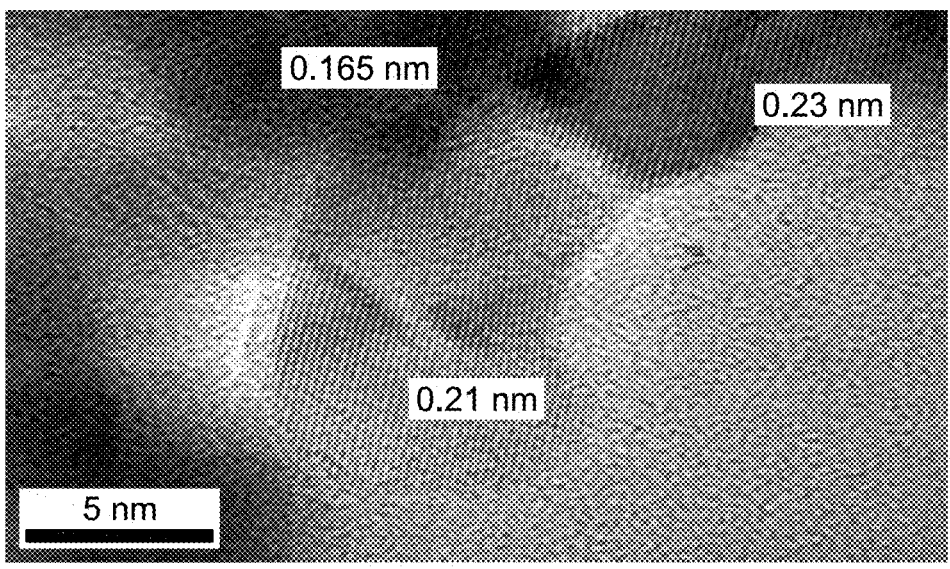
Figure 3D:
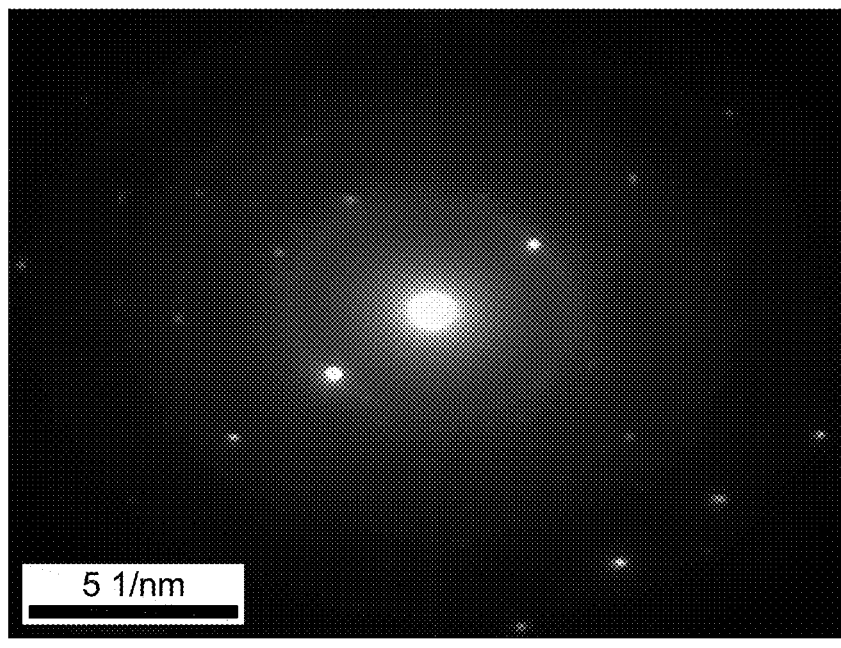
FIG. 3D shows selected area electron diffraction (SAED) patterns of the $ZrO_2$/$CaSiO_3$@g-$C_3N_4$ nanocomposite, according to certain embodiments.
Figure 3E:
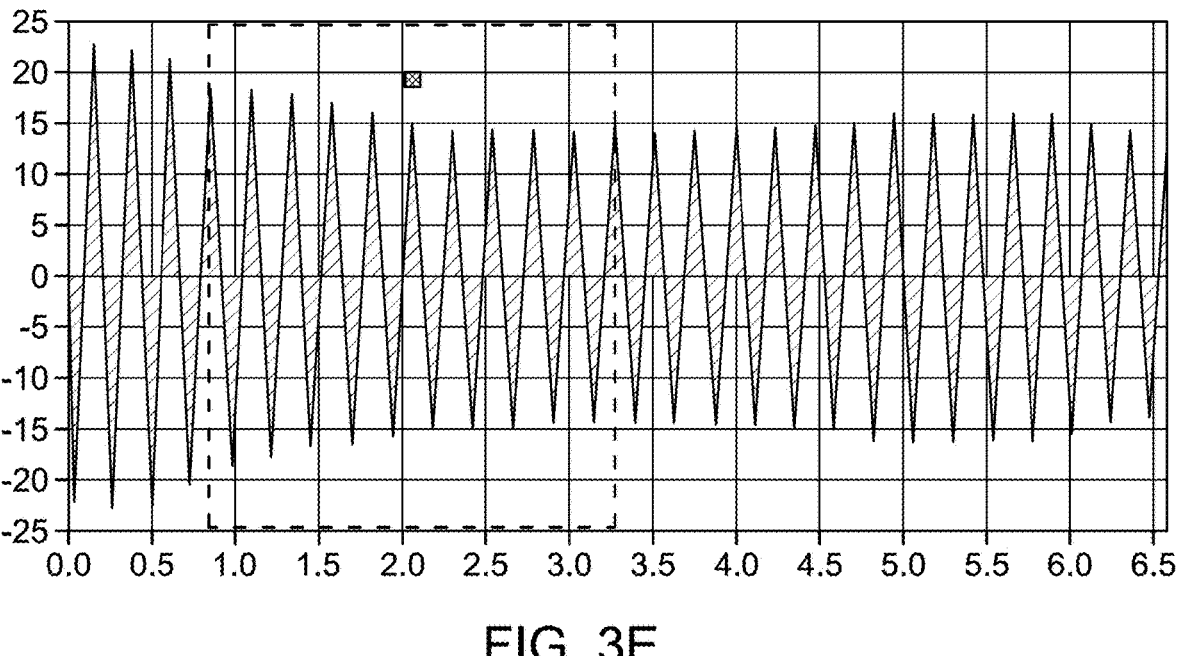
FIG. 3E and FIG. 3F depict fast Fourier transform (FFT) and inverse fast Fourier transform (IFFT) measurements, respectively, of the $ZrO_2$/$CaSiO_3$@g-$C_3N_4$ nanocomposite, according to certain embodiments.
Figure 3F:
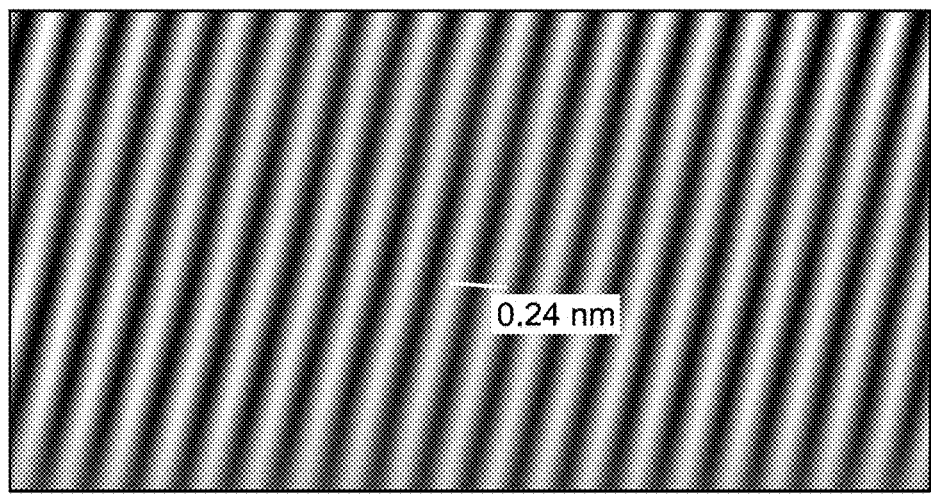

Transmission electron microscopy (TEM) was used to analyze the nanocomposite, providing detailed information about its structural characteristics at the nanoscale. TEM images of the nanocomposite are shown in FIG. 3A to FIG. 3C. These images reveal a two-dimensional porous structure formed by curled and wrinkled nanosheets and platelets of $g-C_3N_4$. The images shown also demonstrate the uniform dispersion of spherical metal oxide nanoparticles, approximately 8.5 nanometer (nm) in size, on the $g-C_3N_4$ nanosheets. The corresponding selected area electron diffraction (SAED) pattern in FIG. 3D displays diffraction spots with interplanar spacings of 0.31 nm, 0.154 nm, and 0.13 nm, which correspond to the diffraction planes (CaSiO$_3$: 202, $ZrO_2$:−111), ($ZrO_2$:−302, $C_3N_4$: 331, $CaSiO_3$: 54-1), and ($CaSiO_3$: 33-4, $ZrO_2$: 123), respectively. Additionally, the TEM images show a plane spacing of 0.23 nm, which is related to the (002) plane of $C_3N_4$. Other planes, such as 0.165 nm and 0.21 nm, are attributed to the ($CaSiO_3$:

40-4, $ZrO_2$:−113) and ($CaSiO_3$: 512, $ZrO_2$:−112) planes, respectively (FIG. 3B). The fast Fourier transform (FFT), and inverse fast Fourier transform (IFFT) measurements, as shown in FIG. 3E and FIG. 3F, respectively, reveal a d-spacing value of 0.24 nm for the $ZrO_2/CaSiO_3@g-C_3N_4$ nanocomposite, which corresponds to the ($C_3N_4$: 220) lattice plane, confirming the successful formation of the $g-C_3N_4$ structure.

Figures 4A, 4B:
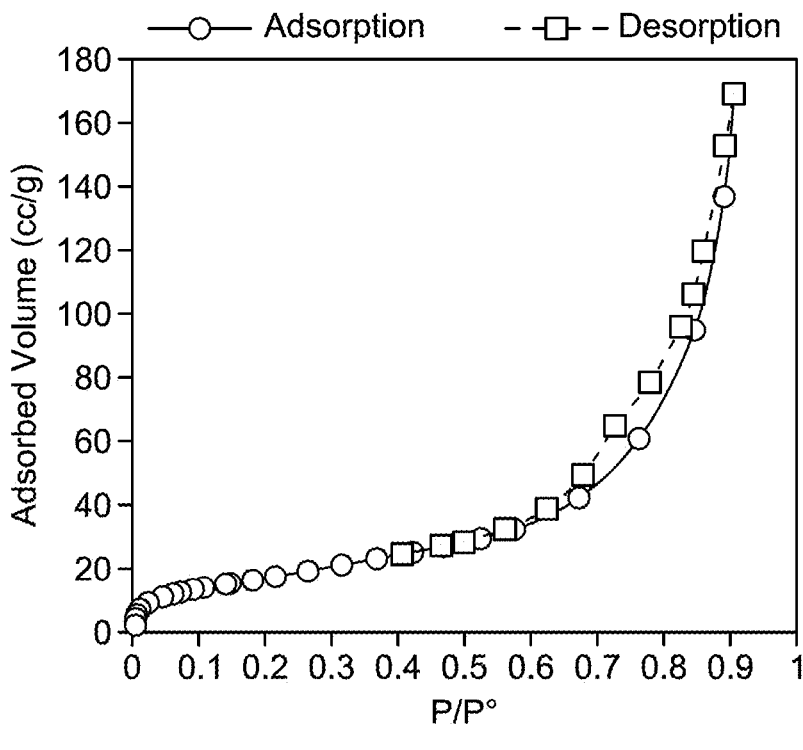
FIG. 4A is a graph depicting nitrogen ($N_2$) adsorption-desorption isotherms and corresponding pore size distribution of the $ZrO_2$/$CaSiO_3$@g-$C_3N_4$, according to certain embodiments.
FIG. 4B is a graph depicting pore size distribution curve of the $ZrO_2$/$CaSiO_3$@g-$C_3N_4$, according to certain embodiments.

FIG. 4A displays the nitrogen adsorption-desorption isotherms of the synthesized nanocomposite. The nitrogen sorption isotherm of the composite exhibits a Type IV curve with a narrow hysteresis loop, indicating the formation of mesoporous structures. However, shifting the loop to a relatively higher pressure (P/P$^0$=0.58-1) indicates the presence of wide mesopores, which may result from the deposition of metal oxides particles in the wide pores of $g-C_3N_4$.

Furthermore, the Brunauer-Emmett-Teller (BET) surface area of the nanocomposite was calculated to be 66.5 square meters per gram ($m^2 g^{-1}$). The higher specific surface area of the nanocomposite reflects the good dispersion of these metal oxides nanoparticles on $g-C_3N_4$ and $CaSiO_3$. Moreover, the pore size distribution curves, plotted using the Barrett-Joyner-Halenda (BJH) method, as shown in FIG. 4B, exhibited a trimodal distribution with average pore diameters maximized at 6.2 nm, 9.53 nm and 17.2 nm and pore volume of 0.26 cubic centimetres per gram ($cm^3 g^{-1}$). All the isotherms belong to the category H3 type of pores, which do not exhibit limiting adsorption at high P/P$^0$ and arise due to aggregation of plate-like particles giving rise to slit-shaped pores. This indicates that the assembly of $ZrO_2/CaSiO_3@g-C_3N_4$ composite produced a mesoporous array.

Figure 5A:
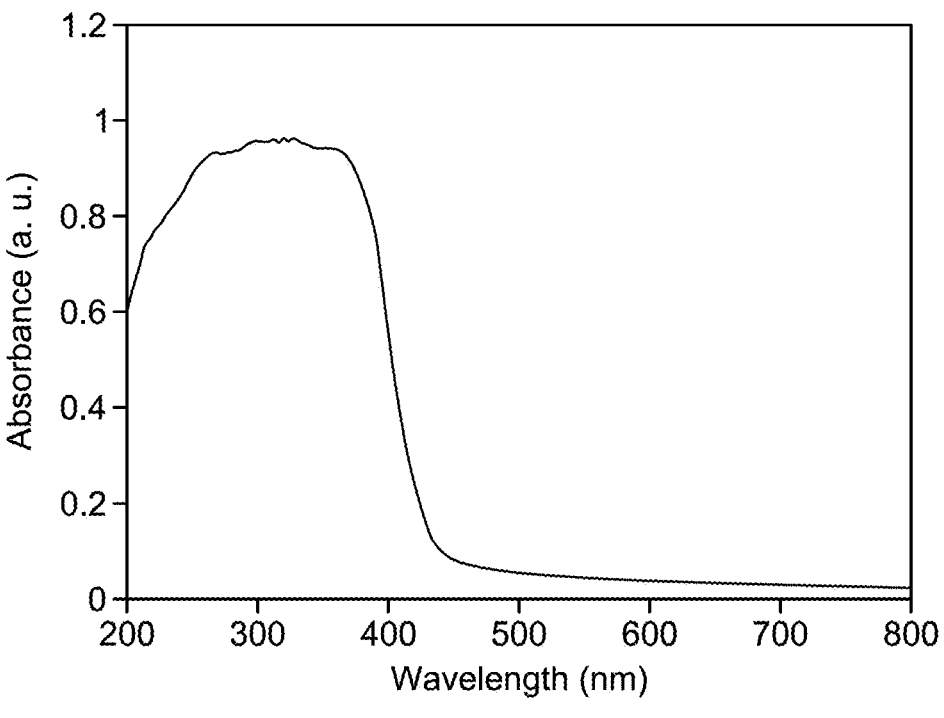
FIG. 5A is a graph depicting UV-visible diffuse reflectance spectra (DRS) spectra of the $ZrO_2$/$CaSiO_3$@g-$C_3N_4$ nanocomposite, according to certain embodiments.

The light absorption properties of the prepared nanocomposite were analyzed through diffuse reflectance spectroscopy (DRS). The effective utilization of the wide-visible light spectrum in photocatalytic processes requires a low bandgap (ranging from 1.77 to 2.92 electron volt (eV)), making it suitable for visible light absorption and photocatalytic applications (Li, Y., et al., Efficient decomposition of organic compounds and reaction mechanism with BiOI photocatalyst under visible light irradiation, *Journal of Molecular Catalysis A: Chemical*, Volume 334, Issues 1-2, 2011, pages 116-122, incorporated herein by reference in its entirety). One of the primary goals of using visible-light-induced photocatalysts is to replace harmful ultraviolet light with safer visible light. The absorbance of the prepared nanocomposite was measured across the range of 200-800 nm as shown in FIG. 5A. The DRS spectra of the nanocomposite shows the incorporation of $g-C_3N_4$ into $ZrO_2/CaSiO_3$ progressively enhancing the composite's absorption in the visible range. This increase in absorption observed may be due to the difference in the band gap energies between $ZrO_2/CaSiO_3$ and bare $g-C_3N_4$. Tauc plot (Eq. 1) was further employed to determine the bandgap-energy ($E_g$) for the synthesized photocatalyst, $$\alpha h\gamma = A(h\gamma - E_g)^n \qquad (1)$$

where h represents the Plank constant, $\alpha$ and $\gamma$ are the absorption coefficient and photonic frequency, and A is a material specific constant (Cheng, H., et al., One-step synthesis of the nanostructured AgI/BiOI composites with highly enhanced visible-light photocatalytic performances, *Langmuir*, 2010, 26, 9, 6618-6624, which is incoprated herein by reference in its entirety).

In calculating the power of n, a value of n=½ was determined, indicating a direct permissible transition.

Figure 5B:
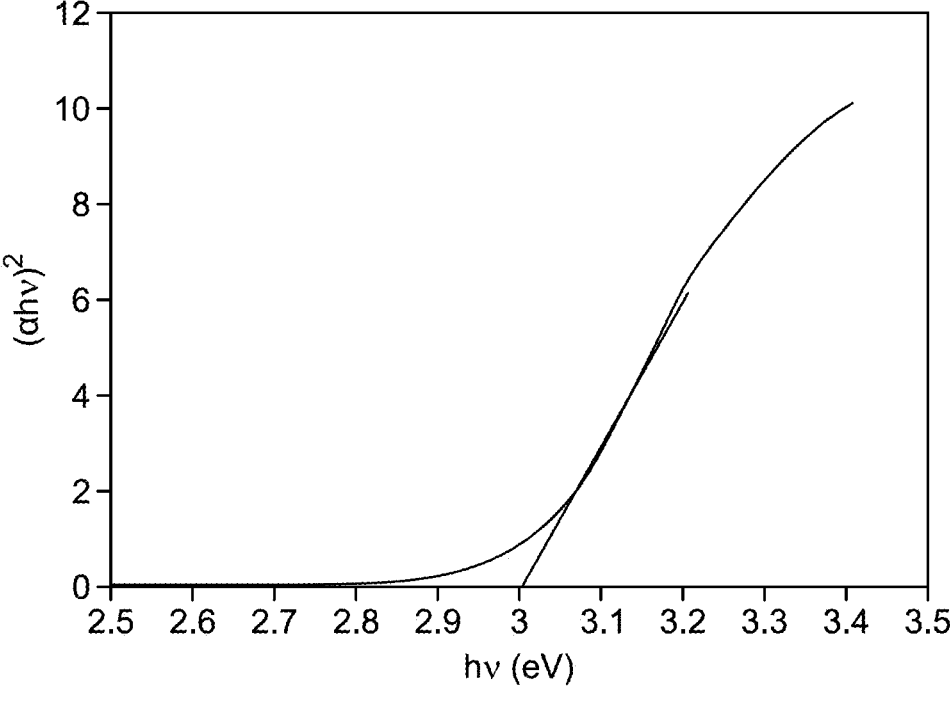
FIG. 5B is a graph depicting the band gap energy of the $ZrO_2$/$CaSiO_3$@g-$C_3N_4$ nanocomposite, according to certain embodiments.

The band gap ($E_g$) of the nanocomposite was estimated to be 3.0 eV, as shown in FIG. 5B. The reduction in the band gap of the nanocomposite and its increased response to visible light was attributed to the incorporation of metal oxide nanoparticles onto $g$-$C_3N_4$. This modification enabled more efficient utilization of solar energy, which in turn indicated an improvement in the photocatalytic activity of the nanocomposite. The estimated band gap was similar to that of bismuth oxyiodide (BiOI), which is known for its high activity in degrading organic compounds under visible light [Mehrali-Afjani, M., et al, A brief study on the kinetic aspect of the photodegradation and mineralization of BiOI—$Ag_3PO_4$ towards sodium diclofenac, *Chemical Physics Letters*, Volume 759, 2020, 137873, incorporated herein by reference in its entirety; Jeevanantham, N., et al., High-performance visible light photocatalytic activity of cobalt (Co) doped CdS nanoparticles by wet chemical route, *Journal of the Iranian Chemical Society*, 2019 16, 2, 243-251, incorporated herein by reference in its entirety; Sabonian, M., et al., Preparation of ZnO nanocatalyst supported on todorokite and photocatalytic efficiency in the reduction of chromium (VI) pollutant from aqueous solution, *Iranian Journal of Catalysis*, 9, 3, 2019, 201-211, incorporated herein by reference in its entirety; and Zeng, L., et al., Preparation of interstitial carbon doped BiOI for enhanced performance in photocatalytic nitrogen fixation and methyl orange degradation, *Journal of Colloid and Interface Science*, Volume 539, 2019, pages 563-574, incorporated herein by reference in its entirety].

The $ZrO_2/CaSiO_3@g$-$C_3N_4$ nanocomposite was successfully synthesized and characterized, exhibiting excellent structural and optical properties. XRD and TEM analysis confirmed the crystalline nature and uniform dispersion of metal oxide nanoparticles on $g$-$C_3N_4$. The BET analysis revealed a high surface area and mesoporous structure, while DRS results demonstrated enhanced visible light absorption due to the incorporation of $g$-$C_3N_4$ and metal oxides. The band gap of the composite was estimated to be 3.0 eV, indicating useful photocatalytic activity under visible light, which could potentially be used for efficient solar energy utilization and organic compound degradation.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of water purification, comprising:
mixing contaminated water comprising one or more pollutants with a zirconium dioxide/calcium silicate/graphitic carbon nitride ($ZrO_2/CaSiO_3/g$-$C_3N_4$) nanocomposite material to form a reaction mixture;
exposing the reaction mixture to light; and
removing the nanocomposite material to form purified water,
wherein the nanocomposite material comprises spherical metal oxide nanoparticles comprising a $ZrO_2$ phase and a $CaSiO_3$ phase dispersed on a matrix of $g$-$C_3N_4$ nanosheets,
wherein the spherical metal oxide nanoparticles have an average particle diameter in a range from 2 to 25 nanometer (nm), wherein the nanocomposite material has a band gap energy in a range from 1.5 to 4 electron volt (eV), and
wherein the nanocomposite material catalyzes the photo-degradation of the one or more pollutants,
wherein the nanocomposite material is in the form of particles having a trimodal pore size distribution with average pore diameters maximized at 6.2, 9.53, and 17.2 nm.

2. The method of claim 1, wherein the nanocomposite material has a band gap energy in a range from 2.3 to 3.7 eV.

3. The method of claim 2, wherein the nanocomposite material has a band gap energy in a range from 2.6 to 3.4 eV.

4. The method of claim 3, wherein the nanocomposite material has a band gap energy in a range from 2.9 to 3.1 eV.

5. The method of claim 4, wherein the nanocomposite material has a band gap energy of 3.0 eV.

6. The method of claim 1, wherein the nanocomposite material is in the form of particles having a BET surface area greater than or equal to 50 square meters per gram ($m^2 \cdot g^{-1}$).

7. The method of claim 6, wherein the nanocomposite material is in the form of particles having a BET surface area greater than or equal to 55 $m^2 \cdot g^{-1}$.

8. The method of claim 7, wherein the nanocomposite material is in the form of particles having a BET surface area greater than or equal to 60 $m^2 \cdot g^{-1}$.

9. The method of claim 8, wherein the nanocomposite material is in the form of particles having a BET surface area greater than or equal to 65 $m^2 \cdot g^{-1}$.

10. The method of claim 9, wherein the nanocomposite material is in the form of particles having a BET surface area of 66.5 $m^2 \cdot g^{-1}$.

11. The method of claim 1, wherein the nanocomposite material is in the form of particles having a pore volume greater than or equal to 0.10 cubic centimeters per gram ($cm^3 \cdot g^{-1}$).

12. The method of claim 11, wherein the nanocomposite material is in the form of particles having a pore volume greater than or equal to 0.15 $cm^3 \cdot g^{-1}$.

13. The method of claim 12, wherein the nanocomposite material h is in the form of particles having as a pore volume greater than or equal to 0.20 $cm^3 \cdot g^{-1}$.

14. The method of claim 13, wherein the nanocomposite material is in the form of particles having a pore volume greater than or equal to 0.25 $cm^3 \cdot g^{-1}$.

15. The method of claim 14, wherein the nanocomposite material is in the form of particles having a pore volume of 0.26 $cm^3 \cdot g^{-1}$.

16. The method of claim 1, wherein the spherical metal oxide nanoparticles have an average particle diameter in a range from 3 to 18 nm.

17. The method of claim 16, wherein the spherical metal oxide nanoparticles have an average particle diameter in a range from 5 to 12 nm.

18. The method of claim 17, wherein the spherical metal oxide nanoparticles have an average particle diameter in a range from 7 to 10 nm.

19. The method of claim 18, wherein the spherical metal oxide nanoparticles have an average particle diameter of 8.5 nm.

* * * * *